UNITED STATES PATENT OFFICE 2,628,241

PROCESS FOR MERCURY DIARYLS

Kenneth A. Kobe and Roy T. McCutchan,
Austin, Tex.

No Drawing. Application July 15, 1949,
Serial No. 105,072

5 Claims. (Cl. 260—433)

This invention relates to a process for the manufacture of mercury diaryl compounds.

It is an object of this invention to produce mercury diaryl compounds in high yields from aryl mercuric salts using only inexpensive inorganic reactants. A further object is to produce the mercury diaryl in such a manner that it is readily separated in pure form from the other reaction products.

Mercury diaryl compounds are useful intermediates in the preparation of other metal aryl compounds. They also undergo many unusual and important reactions with halogen containing compounds. They have specific properties as germicides, fungicides, herbicides, insecticides and the like.

Mercury diaryl compounds are not new and most of the common ones have been prepared in low yields by organic chemists. The production of mercury diphenyl, the most important member of the family at this time, is that of Maynard [J. Am. Chem. Soc., 46, 1510 (1924)]. In this method phenyl mercuric acetate is reduced with sodium stannite solution to produce mercury diphenyl, metallic mercury, sodium stannate and sodium acetate. The metallic mercury formed is colloidal in form and must be amalgamated with powdered zinc before a clear filtrate can be obtained. Maynard reported a yield of 95.6%, however, repeated experiments by us gave a maximum yield of 62% and the method was slow and cumbersome because of the preparation of sodium stannite (an expensive reagent) and the necessity of amalgamating the mercury with zinc dust (from which it was slow and difficult to recover the mercury). Other methods reported in the literature are the action of sodium amalgam on aryl bromides with yields of 27 to 47%; reaction of mercuric halides with aryl Grignard reagents (expensive and difficult to prepare) with yields of 44 to 81%, and other minor methods in which the mercury diaryl occurs in low yields as a by-product of the reaction. These low yields coupled with the expensive reagents frequently used have kept the mercury diaryl from becoming important industrial compounds because of their high cost.

An ideal method would use a relatively cheap aryl mercuric compound, as phenyl mercuric acetate, which is now a commercial item and easily prepared by direct mercuration of the aromatic hydrocarbon with mercuric acetate under known conditions. This aryl mercuric compound would then be caused to react with a cheap inorganic compound under relatively mild reaction conditions in simple laboratory equipment.

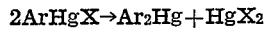

$$2ArHgX \rightarrow Ar_2Hg + HgX_2$$

The mercury diaryl and the mercuric compound should be separated easily and recovered from the reaction mixture in high yield because of the value of each compound.

It has been known that aryl mercuric compounds react with hydrogen sulfide and its salts to produce aryl mercuric sulfides. We have found that this reaction can be made to go quantitatively.

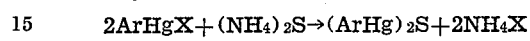

$$2ArHgX + (NH_4)_2S \rightarrow (ArHg)_2S + 2NH_4X$$

We have further found that this aryl mercuric sulfide can be decomposed practically quantitatively by heating under prescribed conditions as here disclosed to form the mercury diaryl and mercuric sulfide.

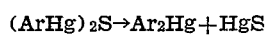

$$(ArHg)_2S \rightarrow Ar_2Hg + HgS$$

The mercury diaryl and mercuric sulfide can be separated easily and both compounds recovered in high yields.

The early chemical literature mentions that phenyl mercuric sulfide decomposes on heating and mercury diphenyl is mentioned as a reaction product. These workers did not report quantitative data and a repetition of their work by us showed that the yield of mercury diphenyl was so slow that a process based on this could have no possible commercial application. Maynard in 1924 dismissed this method as one in which mercury diphenyl was a by-product of the reaction. We have found, however, that if the heating is conducted in the manner to be described that the decomposition is practically quantitative. We have further found that if the temperature used for the heating is too high that the mercury diaryl will undergo decomposition and the yield will be reduced appreciably. The heating must be conducted in the temperature range specified.

We have found that the temperature range for decomposition of the aryl mercuric sulfide should be in the fifteen degree range below the melting point of the mercury diaryl; thus, with phenyl mercuric sulfide, the range is from 110 to 125° C., the latter being the melting point of the mercury diphenyl. At temperatures below this range the rate of decomposition is too slow and even if inordinately long times are used the decomposition reaction never is complete and the yield is low. If the temperature is above this range the mercury diaryl undergoes decomposition and despite the complete decomposition of the aryl mercuric sulfide, the yield is low because of the decomposition of the mercury diaryl.

The decomposition reaction can be carried out either by heating the aryl mercuric sulfide in an oven, or by suspending it in a medium that has the proper boiling point and carrying out the decomposition in suspension. This latter method has advantages in that the mercury diaryl formed will dissolve in the organic solvent used as the heating medium, the mercuric sulfide can easily be separated from the solution by filtration and the mercury diaryl can be recovered from the organic solvent by crystallization. The organic solvent can be recovered and reused in the process. The organic solvent must of necessity be a compound that does not react with the aryl mercuric compound or the mercury diaryl. We have found that organic acids and alcohols so react and we do not use them. We prefer hydrocarbons, particularly aromatic hydrocarbons which are good solvents for the mercury diaryl compound. We do not overlook the fact that ethers and similar organic compounds may be satisfactory solvents. The mercuric sulfide separated can be converted to mercuric oxide by known methods and reused to form more aryl mercuric acetate. Another advantage of the organic solvent is that the moisture need not be removed from the aryl mercuric sulfide before starting its decomposition. By heating the organic solvent to its boiling point it will carry the water from the reaction flask (as in a steam distillation), separate into two phases when condensed and the organic solvent can be returned to the reaction flask whereas the water is retained in a water trap, such as a Dean-Stark or Barrett type receiving trap. The removal of water in this way has a considerable advantage because of the slowness with which the aryl mercuric sulfide ordinarily dries in the air. Considerable equipment would be necessary to remove the moisture under other conditions.

Examples will be given to show how our invention is practiced. Mercury diphenyl is, at the present time, the most important member of the group of mercury diaryls. Our examples will show how this compound is produced, however, it is understood that other aryl mercuric compounds behave in a similar manner and likewise undergo this new reaction. Such aryl groups other than the phenyl are the tolyl, xylyl, cumyl, and cymyl. The word aryl is used to denote benzene and its mono- and poly-alkyl derivatives as here defined.

Example I

Thirty-seven grams of phenyl mercuric acetate, previously prepared by known methods, are dissolved in one liter of distilled water containing 30 grams ammonium acetate and 25 milliliters concentrated ammonium hydroxide to increase the solubility of the phenyl mercuric acetate. Hydrogen sulfide gas is passed into the solution, whereupon a white, bulky precipitate of phenyl mercuric sulfide forms at once, and the treatment is continued until precipitation is complete, about ten to fifteen minutes. This preciptation is quantitative and all phenyl mercuric acetate is converted to the sulfide. The precipitate is filtered on a Buckner funnel, washed with a liter of boiling water and the precipitate passed with a spatula while continuing the suction to remove as much water as possible. The precipitate contains so much water even after sucking dry that it interferes with the decomposition; however, if the funnel and precipitate are placed in a drying oven at 110–120° C. for 20 minutes the precipitate will contract and squeeze much of this water out. The funnel can then be returned to the filter flask and the water removed. Instead of this heating operation, the wet precipitate can be spread out on a suitable tray and dried overnight in the air, if time permits.

The wet precipitate from the Buckner funnel, or the air-dried material, is then spread uniformly on a suitable tray and placed in an oven held at a temperature between 110–120° C. for a period of 35 to 150 minutes. Decomposition of the phenyl mercuric sulfide to mercury diphenyl and mercuric sulfide is substantially complete in this time. The tray is then removed from the oven and allowed to cool. The solids are placed in a beaker and the mercury diphenyl is dissolved in 300 ml. of acetone. The mercury diphenyl is precipitated from the acetone by adding it to 1.75 liters of water. It is best to allow the precipitate to stand in the solution for an hour to allow crystal growth before filtering. The crystals of mercury diphenyl are filtered off and dried in the air. The yield by this process is 86 to 89 per cent of theory.

If the yield is less than this, undecomposed phenyl mercuric sulfide remains in the precipitate. The residue from the acetone extraction is returned to the oven and heated at 110–120° C. for 40 to 60 minutes, removed and extracted with acetone as before.

The mercuric sulfide formed in this process can be treated by known methods to form mercuric oxide that can be used again in the preparation of phenyl mercuric acetate.

Example II

For continuous operation and to secure higher yields the decomposition can best be carried out in a hydrocarbon suspension.

To 26.9 liters of distilled water are added 672 ml. of concentrated ammonium hydroxide and 807 grams of ammonium acetate. In this solution is dissolved 994 grams of phenyl mercuric acetate. Hydrogen sulfide is passed into the solution until precipitation is complete, and the precipitate is collected in a nutsche filter. The filtrate can be saved for reuse in the process after proper processing. The precipitate is washed with 50 liters of water and then 25 liters of boiling water to shrink the bulk of the precipitate. The moist precipitate is suspended in 13.4 liters of toluene, which is then heated to boiling. The boiling is continued at such a rate that the water in the precipitate is carried off and collected in a water trap in a period of 35 minutes while the condensed toluene is allowed to run back into the flask. The temperature in the boiling toluene shows 119° C. (at normal barometric pressure). At the end of the heating period the suspension of mercuric sulfide in a solution of mercury diphenyl in toluene is filtered off and washed with 1.5 liters of hot toluene. The mercuric sulfide is converted to mercuric oxide for reuse. The solution is now distilled to remove 13.4 liters of toluene and the solution cooled to crystallize out mercury diphenyl. This process of distillation and crystallization can be repeated to recover all of the mercury diphenyl in a yield of 95 to 98 per cent. If further batches of mercury diphenyl are to be made, the mother liquor can be recycled in the process, together with the toluene distilled off, and thus none of the mercury diphenyl is lost, but is recovered in the subsequent operation.

We claim:

1. A process for preparing mercury diphenyl comprising the steps of dissolving phenyl mercuric acetate in a suitable solvent, precipitating phenyl mercuric sulfide by the addition of a soluble inorganic sulfide and separating the precipitate from said solution, decomposing said phenyl mercuric sulfide to mercury diphenyl and mercuric sulfide by heating said phenyl mercuric sulfide to a temperature of 110 to 125° C. for a length of time from 30 to 150 minutes, and separating said mercury diphenyl from said mercuric sulfide.

2. In a process for preparing mercury diphenyl, the step which consists of heating phenyl mercuric sulfide to a temperature between 110 and 125° C. for a length of time from 30 to 150 minutes to cause decomposition to mercury diphenyl and mercuric sulfide.

3. A process for preparing mercury diphenyl comprising the steps of dissolving phenyl mercuric acetate in a suitable solvent, precipitating phenyl mercuric sulfide by the addition of a soluble inorganic sulfide and separating the precipitate from said solution, decomposing said phenyl mercuric sulfide by suspending it in a non-reactive organic solvent for the mercury diphenyl, heating said solvent to a temperature within the range 110 to 125° C. for a length of time from 30 to 150 minutes to decompose said phenyl mercuric sulfide, and separating the mercuric sulfide formed from the solution of mercury diphenyl in said organic solvent.

4. A process for preparing mercury diphenyl comprising the steps of dissolving phenyl mercuric acetate in a suitable solvent, precipitating phenyl mercuric sulfide by the addition of a soluble inorganic sulfide and separating the precipitate from said solution, suspending said moist pecipitate in a non-reactive solvent immiscible with water, decomposing said phenyl mercuric sulfide to mercury diphenyl and mercuric sulfide by heating said solvent to a temperature within the range 110 to 125° C. for a length of time from 30 to 150 minutes, removing the vapors of solvent and water, condensing said vapors to immiscible liquids and returning said liquid solvent to the boiling mixture, and separating the mercuric sulfide formed from the solution of mercury diphenyl in said organic solvent.

5. A process for preparing mercury diphenyl comprising the steps of dissolving phenyl mercuric acetate in a suitable solvent, precipitating phenyl mercuric sulfide by the addition of a soluble inorganic sulfide and separating the precipitate from said solution, suspending said moist precipitate in toluene, boiling said toluene suspension for a length of time from 30 to 60 minutes to cause the decomposition of the phenyl mercuric sulfide to mercury diphenyl and mercuric sulfide, removing the vapors of toluene and water arising from the boiling suspension, condensing said vapors to immiscible liquids and returning the liquid toluene to the boiling mixture, and separating the mercuric sulfide formed from the solution of mercury diphenyl in toluene.

KENNETH A. KOBE.
ROY T. McCUTCHAN.

REFERENCES CITED

The following references are of record in the file of this patent:

L. Pesci—Gazzetta Chimica Italiana—vol. XXIX, part I, p. 394–395.